(12) United States Patent
Abreu (10) Patent No.: US 11,794,522 B2
(45) Date of Patent: Oct. 24, 2023

(54) AXLE WHEEL END AXIAL THRUST ASSEMBLY

(71) Applicant: JTEKT Bearings North America LLC, Greenville, SC (US)

(72) Inventor: Christopher Abreu, Simpsonville, SC (US)

(73) Assignee: JTEKT Bearings North America LLC, Greenville, SC (US)

( * ) Notice: Subject to any disclaimer, the term of this patent is extended or adjusted under 35 U.S.C. 154(b) by 0 days.

(21) Appl. No.: 17/567,447

(22) Filed: Jan. 3, 2022

(65) Prior Publication Data
US 2022/0194125 A1 Jun. 23, 2022

Related U.S. Application Data

(63) Continuation of application No. 15/510,643, filed as application No. PCT/US2015/049720 on Sep. 11, 2015, now abandoned.
(Continued)

(51) Int. Cl.
*B60B 35/18* (2006.01)
*F16C 33/58* (2006.01)
(Continued)

(52) U.S. Cl.
CPC .............. *B60B 35/18* (2013.01); *F16C 19/46* (2013.01); *F16C 33/585* (2013.01);
(Continued)

(58) Field of Classification Search
CPC ........ F16C 19/225; F16C 19/44; F16C 19/46; F16C 33/585; F16C 35/067;
(Continued)

(56) References Cited

U.S. PATENT DOCUMENTS

| 837,830 A | 12/1906 | Heinkel et al. |
| 1,188,712 A | 6/1916 | Avrunin |

(Continued)

FOREIGN PATENT DOCUMENTS

| EP | 2065603 A1 | 6/2009 |
| WO | 2008/110938 A2 | 9/2008 |
| WO | 2014/074507 A1 | 5/2014 |

OTHER PUBLICATIONS

International Search Report and Written Opinion dated Dec. 8, 2015 for PCT/US2015/049720.

*Primary Examiner* — James Pilkington
(74) *Attorney, Agent, or Firm* — Nelson Mullins Riley & Scarborough LLP (57) ABSTRACT

An axle assembly of a vehicle including a differential assembly, a first axle tube including a proximal end adjacent the differential assembly, an opposite distal end, and an axle bore extending therebetween, a first axle shaft rotatably received in the first axle tube, the first axle shaft including a proximal end disposed in the differential assembly, and an opposite distal end extending outwardly from the distal end of the first axle shaft, and a radial bearing assembly including an inner cup, an outer cup and a plurality of roller
(Continued)

elements rotatably received therebetween, the outer cup being axially fixed within the axle bore of the first axle tube and the inner cup being axially fixed to the first axle shaft.

5 Claims, 7 Drawing Sheets

Related U.S. Application Data (60) Provisional application No. 62/049,159, filed on Sep. 11, 2014.

(51) Int. Cl.
*F16C 35/067* (2006.01)
*F16C 19/46* (2006.01)

(52) U.S. Cl.
CPC ........ *F16C 35/067* (2013.01); *B60B 2380/14* (2013.01); *B60B 2380/16* (2013.01); *B60B 2380/50* (2013.01); *B60B 2380/71* (2013.01); *F16C 2326/06* (2013.01)

(58) Field of Classification Search
CPC . F16C 2326/06; B60B 35/18; B60B 2380/14; B60B 2380/16; B60B 2380/50; B60B 2380/71
USPC ........................................................ 301/126
See application file for complete search history.

(56) References Cited

U.S. PATENT DOCUMENTS

| | | | |
|---|---|---|---|
| 2,839,343 A | 6/1958 | Emil | |
| 3,497,277 A | 2/1970 | Malott | |
| 3,515,448 A * | 6/1970 | Jensen | F16C 35/06 384/589 |
| 3,667,822 A | 6/1972 | Armstrong et al. | |
| 3,690,399 A * | 9/1972 | Bokovoy | B60K 17/16 74/650 |
| 5,071,265 A | 12/1991 | Bowen et al. | |
| 5,458,421 A | 10/1995 | Giese | |
| 6,997,617 B2 | 2/2006 | Ide et al. | |
| 7,416,346 B2 | 8/2008 | Takemura et al. | |
| 7,524,114 B2 | 4/2009 | Gresley | |
| 8,092,132 B2 | 1/2012 | Zink et al. | |
| 8,328,430 B2 | 12/2012 | Masuda et al. | |
| 8,414,194 B2 | 4/2013 | Ito | |
| 8,511,904 B2 * | 8/2013 | Lunz | F16C 33/588 384/618 |
| 9,593,757 B2 | 3/2017 | Downs et al. | |
| 2005/0058381 A1 | 3/2005 | Kiyo | |
| 2015/0033909 A1* | 2/2015 | Campbell | F16C 35/063 74/607 |
| 2017/0210166 A1 | 7/2017 | Abreu | |

* cited by examiner

AXLE WHEEL END AXIAL THRUST ASSEMBLY

CLAIM OF PRIORITY

This application is a continuation of U.S. patent application Ser. No. 15/510,643 filed Mar. 10, 2017, which is a 35 U.S.C. § 371 national stage application of PCT/US2015/049720, filed Sep. 11, 2015, which claims the benefit of U.S. Provisional Patent Application No. 62/049,159 filed Sep. 11, 2014, the entire disclosures of which are incorporated herein.

FIELD OF THE INVENTION

The present disclosure relates generally to solid axle assemblies for vehicles and, more specifically, to bearing assemblies that are utilized on the wheel end sections of such solid axle assemblies.

BACKGROUND

Salisbury solid axles are often used in passenger trucks and sport utility vehicles. Salisbury axles are unique in the fact that the axle transmits driving torque to the wheel as well as carries and transmits both radial and axial thrust loads.

Figure 1:
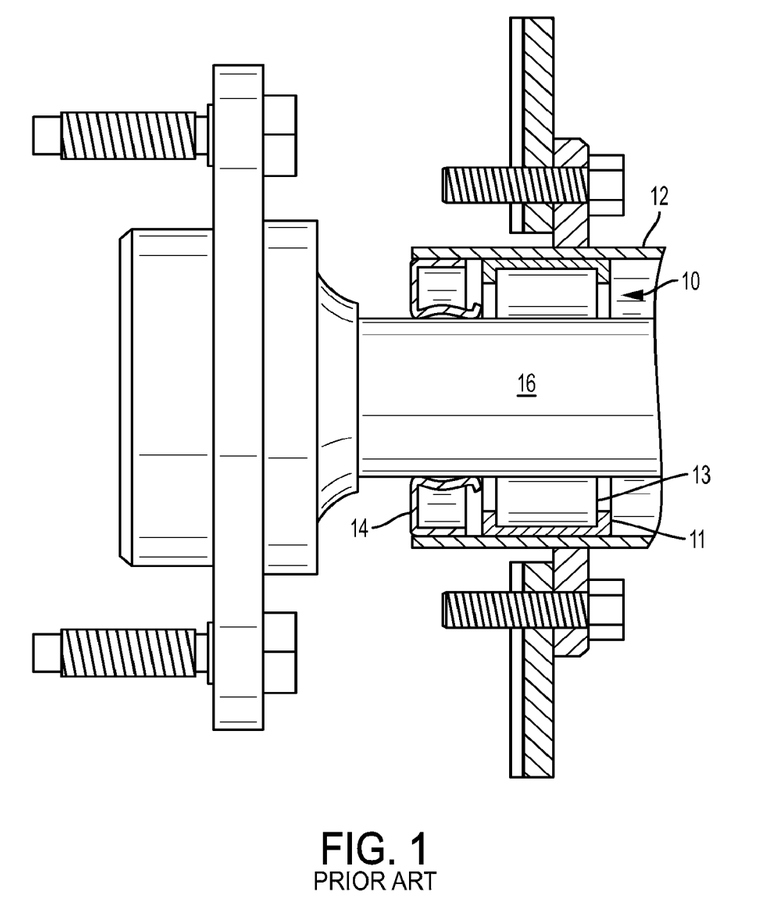
FIG. 1 is a partial cross-sectional view of a wheel end section of a prior art solid axle assembly.

As shown in FIG. 1, many existing wheel end bearings 10 used with solid axle assemblies include an outer cup 11 that is press-fit into the corresponding axle tube 12 to maintain location and define an outer raceway for the corresponding rollers 13. No additional retention features are required for this type of wheel end bearing 10 in that the bearing only handles radial loads. Lubrication for wheel end bearing 10 is provided by the same oil sump that provides lubrication to the differential gears 15 (FIG. 2) that are disposed at the center section of the axle assembly. To maintain lubrication, an oil seal 14 is press-fitted outboard of the wheel end bearing in axle tube 12.

Figure 2:
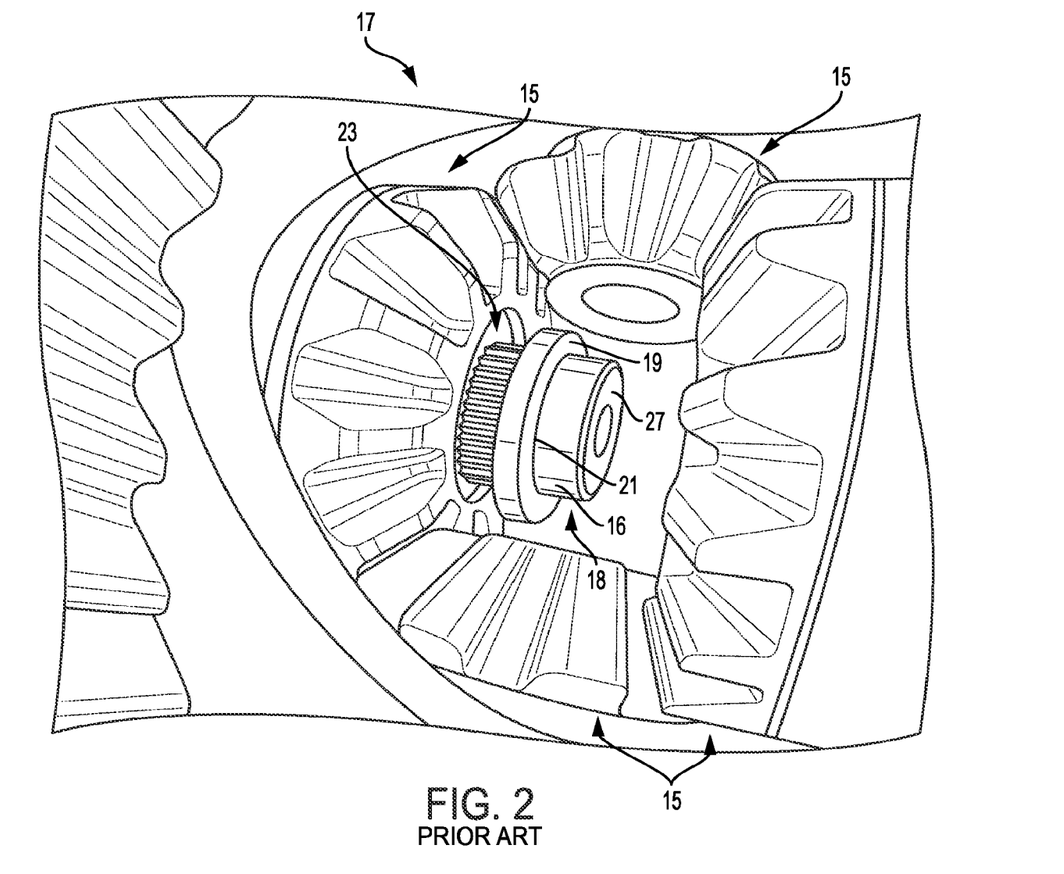
FIG. 2 is a partial perspective view of the prior art axle shaft shown in FIG. 1 and a corresponding differential.
Figure 3:
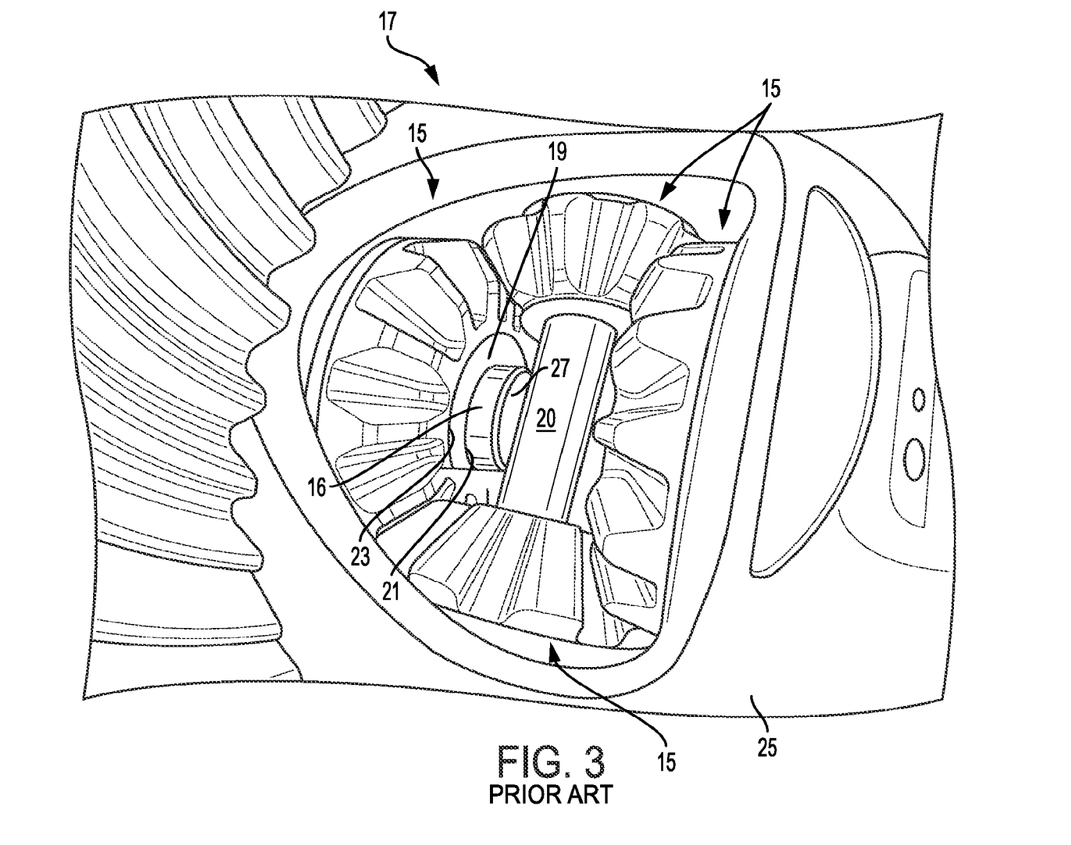
FIG. 3 is a partial perspective view of the prior art axle shaft and differential shown in FIG. 2, including a cross shaft of the differential.
Figure 4:
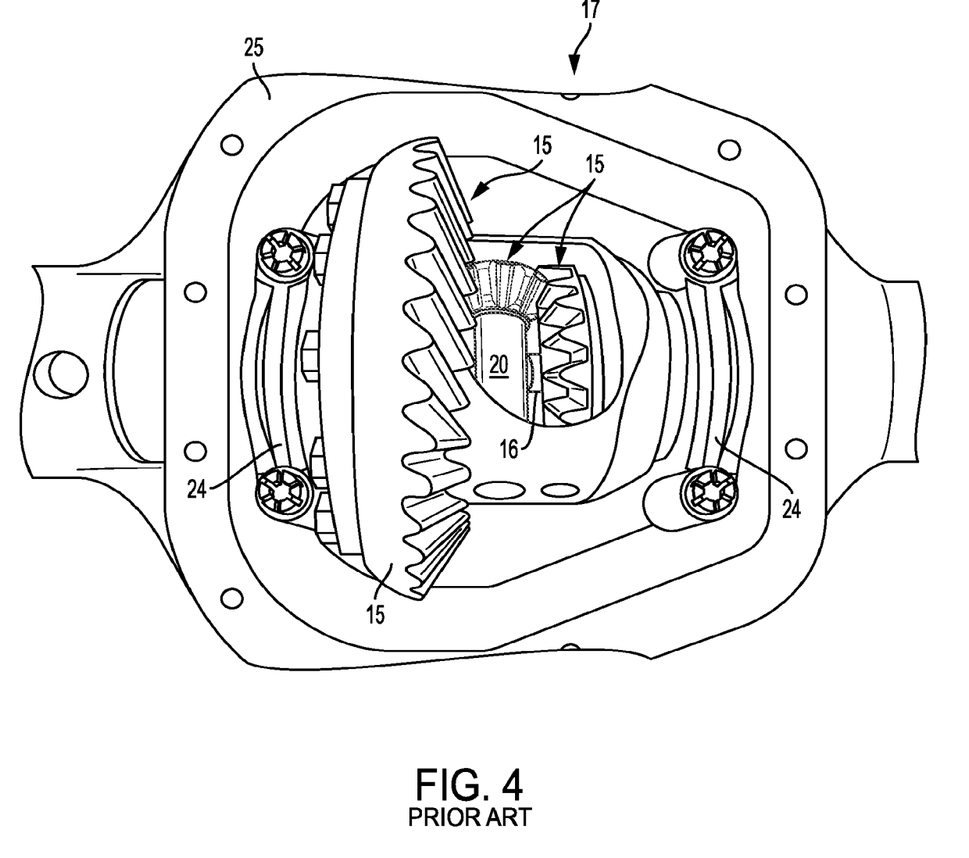
FIG. 4 is a cut away side view of the prior art axle shaft and differential shown in FIG. 2.

Radial wheel end loads are handled primarily at wheel end bearing 10, whereas axial loads are not. Rather, as best seen in FIGS. 2 through 4, axial loads are transmitted along axle shaft 16. Typically, "C Locks" 18 are utilized to resist outward axial loading and a cross shaft 20 disposed between the opposing axles in a housing 25 of differential 17 absorbs inward axial loading. A typical C Lock includes a heavy annular lock ring 19 received in an annular groove 21 formed on the inboard end of a corresponding axle shaft 16. In the fully assembled configuration (FIG. 3), annular lock ring 19 is further received in an annular recess 23 formed in an end face of a corresponding differential gear 15. During normal operations, inward axial loading has a higher magnitude than outward axial loading due to vehicle dynamics during cornering. When outward axial load on axle shaft 16 occurs, axle shaft 16 attempts to move outwardly from axle tube 12, which causes annular lock ring 19 of the corresponding C Lock 18 to push on the corresponding differential side gear 15. Ultimately, the outward axial load is dispersed through differential carrier bearings 24 to housing 25 of the differential, as shown in FIG. 4.

When inward axial loading is generated from vehicle cornering, an end face 27 of axle shaft 16 thrusts against differential cross shaft 20, as best seen in FIG. 2. In turn, the inward axial loading is transmitted through differential carrier bearings 24, as shown in FIG. 4.

The present invention recognizes and addresses considerations of prior art constructions and methods.

SUMMARY

One embodiment of an axle assembly of a vehicle includes a differential assembly, a first axle tube extending outwardly from a first side of the differential assembly, the first axle tube including a proximal end adjacent the differential assembly, an opposite distal end, and an axle bore extending therebetween, a first axle shaft rotatably received in the first axle tube, the first axle shaft including a proximal end disposed in the differential assembly, and an opposite distal end extending outwardly from the distal end of the first axle shaft, a radial bearing assembly including an inner cup, an outer cup and a plurality of roller elements rotatably received therebetween, the outer cup being axially fixed within the axle bore of the first axle tube and the inner cup being axially fixed to the first axle shaft.

Another embodiment of an axle assembly of a vehicle includes a differential assembly, a first axle tube extending outwardly from a first side of the differential assembly, the first axle tube including a proximal end adjacent the differential assembly, an opposite distal end, and an axle bore extending therebetween, a first axle shaft rotatably received in the first axle tube, the first axle shaft including a proximal end disposed in the differential assembly, and an opposite distal end extending outwardly from the distal end of the first axle shaft, an annular groove defined in the axle bore of the first axle tube, a snap ring received in the annular groove, a radial bearing assembly including an inner cup, an outer cup and a plurality of roller elements rotatably received therebetween, wherein the snap ring is adjacent the outer cup of the radial bearing assembly.

Yet another embodiment of an axial thrust assembly for use with an axle assembly of a vehicle having an axle tube and an axle shaft rotatably received therein includes a radial bearing assembly comprising an inner cup having an inner race, a first annular flange, and a second annular flange, the first annular flange and the second annular flange extending radially outwardly from opposing ends of the inner race, an outer cup further comprising an outer race, a first annular flange, and a second annular flange, the first annular flange and the second annular flange extending radially inwardly from opposing ends of the outer race, and a plurality of roller elements disposed between the inner cup and the outer cup, wherein the outer cup is axially fixed within the axle bore of the first axle tube and the inner cup is axially fixed to the first axle shaft.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 5:
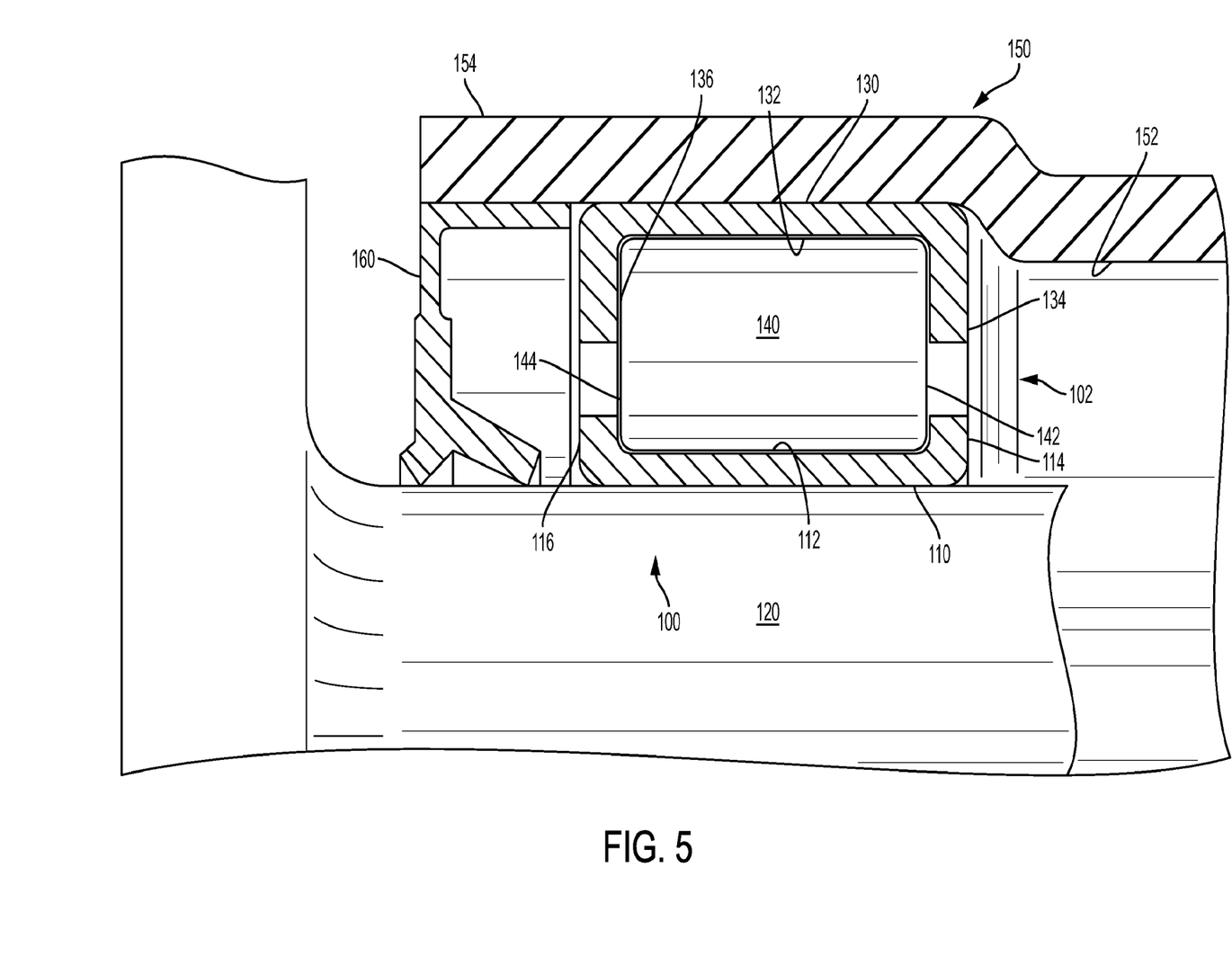
FIG. 5 is a partial cross-sectional view of a wheel end section of a solid axle assembly including an axial thrust assembly in accordance with an embodiment of the present invention.
Figure 6:
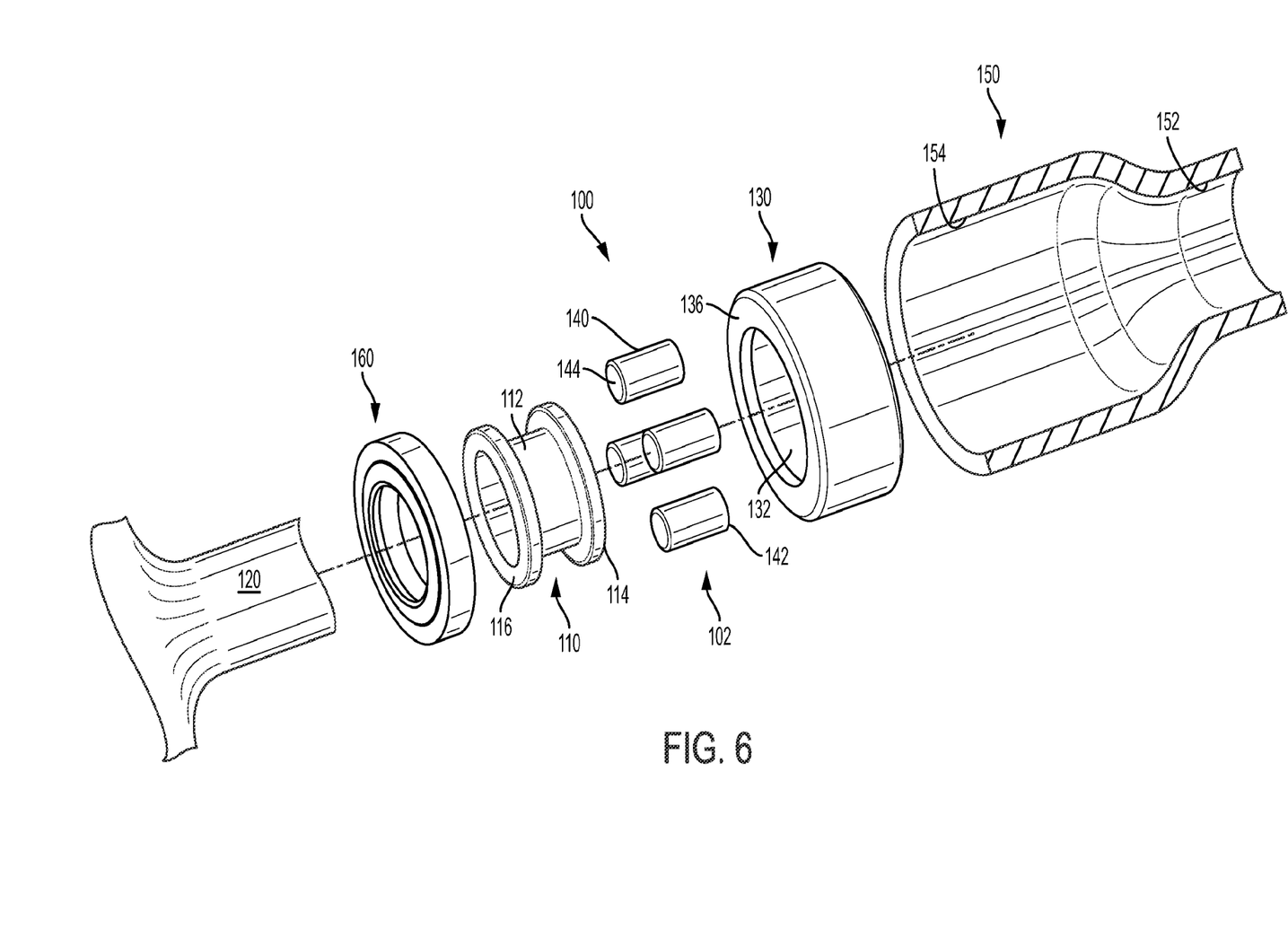
FIG. 6 is an exploded perspective view of the axial thrust assembly shown in FIG. 5.

Referring now to FIGS. 5 and 6, in order to eliminate C Locks 18 (FIGS. 2 and 3) from the differential 17 of prior art axle assemblies, an axial thrust assembly 100 for use with a solid axle assembly in accordance with the present disclosure includes a radial bearing assembly 102 having flanged inner cup 110, a flanged outer cup 130, and a plurality of rolling elements 140 (needle rollers) disposed therebetween. Note, the full complement of needle rollers 140 is not shown in FIG. 6. Inner cup 110 and outer cup 130 are axially fixed to axle shaft 120 and axle tube 150, respectively, by way of a press-fit. The press-fit between inner cup 110 and axle shaft 120, and outer cup 130 and axle tube 150 also provide shaft retention within axle tube 150.

As noted above, radial bearing assembly 102 includes inner cup 110, outer cup 130 and needle rollers 140 disposed therebetween. Inner cup 110 defines a cylindrical inner race 112 for needle rollers 140. Additionally, a first annular flange 114 and a second annular flange extend radially-outwardly from opposite ends of inner race 112. Preferably, inner cup 110 is a machined and ground component made from a carburized grade of steel to enhance control of the press-fit, bearing clearances, and increase allowable hoop stresses. As noted, inner cup 110 is axially fixed to the wheel end of axle shaft 120 in a press-fit.

Outer cup 130 defines a cylindrical outer race 132 for needle rollers 140. A first annular flange 134 and second annular flange 136 extend radially-inwardly from opposite ends of outer race 132. As with inner cup 110, outer cup 130 is preferably a machined and ground component made from a carburized grade of steel to enhance control of the press-fit, bearing clearances, and increase allowable hoop stresses. As best seen in FIG. 5, outer cup 130 is preferably received in an enlarged portion 154 of axle tube 150, as compared to bore 152 of the remainder of the tube. Because enlarged portion 154 has a greater diameter than bore 152, a larger complement of needle rollers 140, both in size and number, may be utilized in radial bearing assembly 102 than in standard prior art wheel end radial bearings 10 (FIG. 1), which are typically received in portions of the corresponding axle tube 12 that are the same diameter as the remainder of the tube's bore. The increased roller complement allows for radial bearing assembly 102 to yield dynamic load ratings equivalent to current wheel end bearing arrangements that handle radial loading only.

Each needle roller 140 includes a cylindrical rolling surface extending between a first end face 142 and a second end face 144 thereof. Each first and second end face 142 and 144 is transverse to a longitudinal center axis of the corresponding needle roller 140. As such, when needle rollers 140 are disposed between inner cup 110 and outer cup 130, first end faces 142 and second end faces 144 are parallel to first annular flanges 114 and 134 and second annular flanges 116 and 136, respectively, of inner and outer cups 110 and 130, respectively. As shown in FIG. 5, an oil seal 160 is press-fit into enlarged portion 154 of axle tube 150 to help maintain lubricating fluids therein.

Figure 7:
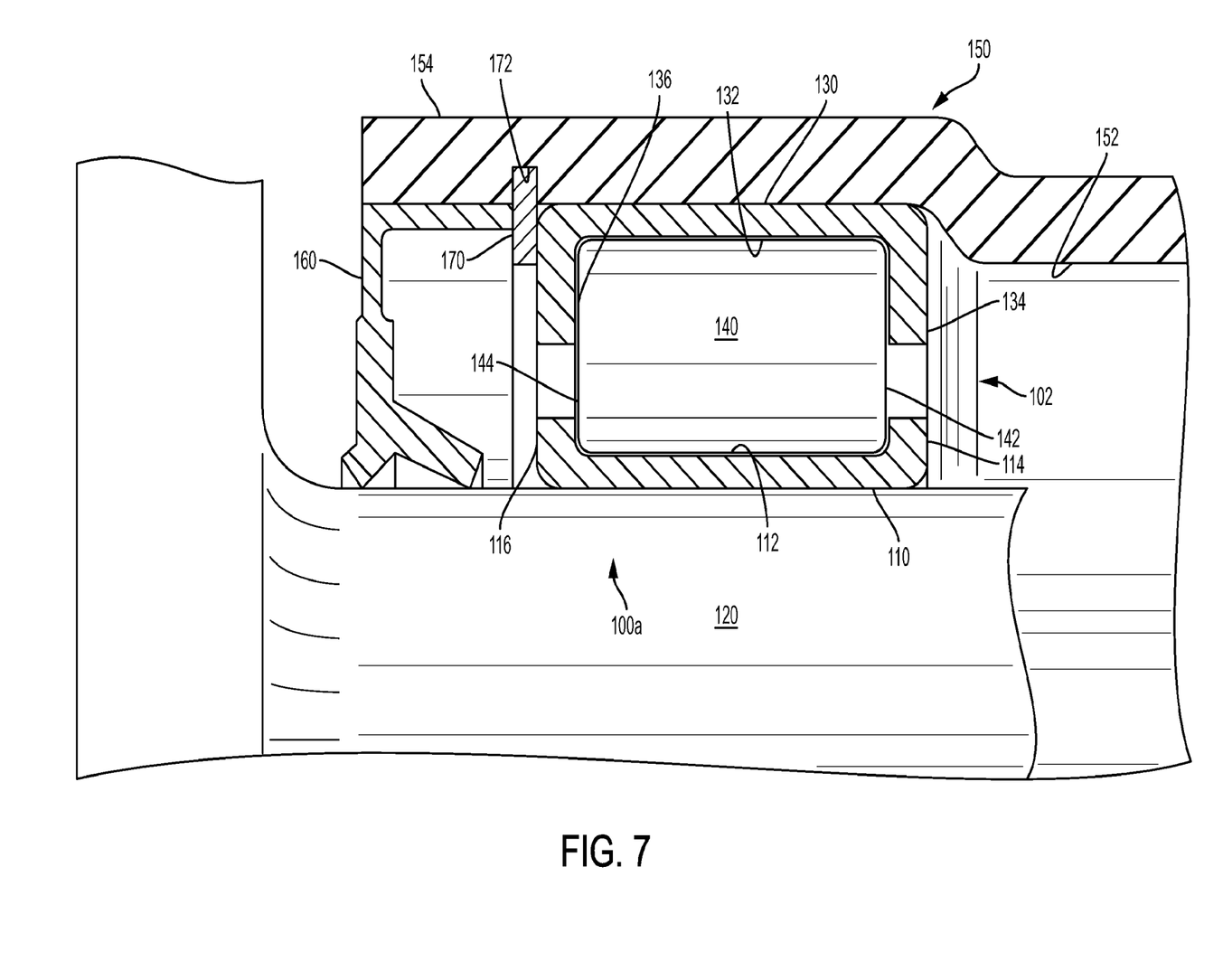
FIG. 7 is a partial cross-sectional view of a wheel end section of a solid axle assembly including an axial thrust assembly in accordance with an alternate embodiment of the present invention.

As best seen in FIG. 5, during vehicle operations, axial thrust forces on axle shaft 120 are transferred to inner cup 110 of radial bearing assembly 102 due to the press-fit between the two components. When the axial thrust force is directed outwardly, the axial thrust force is transferred from inner cup 110 to needle rollers 140 by way of first annular flange 114 abutting their first end faces 142. As such, second end faces 144 of rollers 140 abut second annular flange 136 of outer cup 130, which transfers the outward axial thrust force to axle tube 150 by way of the press-fit therebetween. As shown in FIG. 7, in an alternate embodiment of axial thrust assembly 100a, a snap ring 170 may be provided in an annular groove 172 outboard of radial bearing assembly 102 to transfer outward axial thrust loads from outer cup 130 to axle tube 150. When snap ring 170 is utilized, outer cup 130 need not be press-fit into axle tube 150. In some alternate embodiments, one or more annular washers may be disposed, one each, between first and second end faces 142 and 144 of the plurality of needle rollers 140 and first annular flanges 114 and 134 and second annular flanges 116 and 136 of the bearing cups, respectively, to provide a more uniform bearing surface between the rollers and flanges.

When the axial thrust force caused by vehicle operations is directed inwardly, the axial thrust force is transferred to inner cup 110 of radial bearing assembly 102 due to the press-fit between the two components. In turn, the inward axial thrust force is transferred from inner cup 110 to needle rollers 140 by way of second annular flange 116 abutting their second end faces 144. As such, first end faces 142 of rollers 140 abut first annular flange 134 of outer cup 130, which transfers the inward axial thrust force to axle tube 150 by way of the press-fit therebetween.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

The invention claimed is:

1. An axle assembly of a vehicle, comprising:
a differential assembly;
a first axle tube extending outwardly from a first side of the differential assembly, the first axle tube including a proximal end adjacent the differential assembly, an opposite distal end, and an axle bore extending therebetween;

a first axle shaft rotatably received in the first axle tube, the first axle shaft including a proximal end disposed in the differential assembly, and an opposite distal end extending outwardly from the distal end of the first axle tube; and a radial bearing assembly including an inner cup, an outer cup and a plurality of needle rollers rotatably received therebetween, each needle roller including a first end face and second end face, the first and second end faces being transverse to a longitudinal center axis of the needle roller, the outer cup including an outer race, a first annular flange, and a second annular flange, the first annular flange and the second annular flange extending radially inwardly from opposing ends of the outer race, and the outer cup being axially fixed within the axle bore of the first axle tube by a press-fit, and the inner cup including an inner race, a first annular flange, and a second annular flange, the first annular flange and the second annular flange extending radially outwardly from opposing ends of the inner race and being transverse to a longitudinal center axis of the first axle shaft, and the inner cup being axially fixed to the first axle shaft by a press-fit, wherein the first and second end faces of each needle roller are parallel to the first and second annular flanges of both the outer cup and the inner cup, and the press-fit between the inner cup and the first axle shaft and the outer cup and the first axle tube provide retention of the first axle shaft within the first axle tube such that axial thrust force in both inward and outward axial directions is transferred between the inner and outer cups via the needle rollers with the axial thrust in the outward direction being transferred solely via the needle rollers.

2. The axle assembly of claim 1, further comprising:
an annular groove defined in the axle bore of the first axle tube between the radial bearing assembly and the distal end of the axle tube; and
a snap ring received in the annular groove,
wherein the snap ring is adjacent the outer cup of the radial bearing assembly.

3. An axle assembly of a vehicle, comprising:
a differential assembly;
a first axle tube extending outwardly from a first side of the differential assembly, the first axle tube including a proximal end adjacent the differential assembly, an opposite distal end, and an axle bore extending therebetween;
a first axle shaft rotatably received in the first axle tube, the first axle shaft including a proximal end disposed in the differential assembly, and an opposite distal end extending outwardly from the distal end of the first axle tube;
an annular groove defined in the axle bore of the first axle tube;
a snap ring received in the annular groove; and
a radial bearing assembly including an inner cup, an outer cup and a plurality of needle rollers rotatably received therebetween, each needle roller including a first end face and a second end face, the first and second end faces being transverse to a longitudinal center axis of the needle roller, the inner cup including an inner race, a first annular flange, and a second annular flange, the first annular flange and the second annular flange extending radially outwardly from opposing ends of the inner race and being transverse to a longitudinal center axis of the first axle shaft, and the inner race being axially fixed to the first axle shaft by a press-fit, and the outer cup including an outer race, a first annular flange, and a second annular flange, the first annular flange and the second annular flange extending radially inwardly from opposing ends of the outer race and being transverse to a longitudinal center axis of the first axle shaft, and the outer cup being axially fixed to the first axle tube by a press-fit, wherein the snap ring is adjacent the outer cup of the radial bearing assembly, and wherein the first and second end faces of each needle roller are parallel to the first and second annular flanges of both the outer cup and the inner cup, and the press-fit between the inner cup and the first axle shaft and the outer cup and the first axle tube provide retention of the first axle shaft within the first axle tube such that axial thrust force in both inward and outward axial directions is transferred between the inner and outer cups via the needle rollers with the axial thrust in the outward direction being transferred solely via the needle rollers.

4. The axle assembly of claim 3, wherein the snap ring is adjacent one of the first annular flange and the second annular flange of the outer cup.

5. An axle assembly of a vehicle comprising:
an axle tube defining an axle bore and an axle shaft rotatably received therein;
a radial bearing assembly comprising:
an inner cup having an inner race, a first annular flange, and a second annular flange, the first annular flange and the second annular flange extending radially outwardly from opposing ends of the inner race and being transverse to a longitudinal center axis of the axle shaft;
an outer cup further comprising an outer race, a first annular flange, and a second annular flange, the first annular flange and the second annular flange extending radially inwardly from opposing ends of the outer race and being transverse to a longitudinal center axis of the axle shaft; and
a plurality of needle rollers disposed between the inner cup and the outer cup, each needle roller including a first end face and a second end face, the first and second end faces being transverse to a longitudinal center axis of the needle roller,
wherein the outer cup is axially fixed within the axle bore of the axle tube by a press-fit and the inner cup is axially fixed to the axle shaft by a press-fit; and
wherein the first and second end faces of each needle roller are parallel to the first and second annular flanges of both the outer cup and the inner cup, and the press-fit between the inner cup and the axle shaft and the outer cup and the axle tube provide retention of the axle shaft within the axle tube such that axial thrust force in both inward and outward axial directions is transferred between the inner and outer cups via the needle rollers with the axial thrust in the outward direction being transferred solely via the needle rollers.

* * * * *